UNITED STATES PATENT OFFICE.

HARRY L. WOLLENBERG AND CHARLES A. BIGELOW, OF NEW YORK, N. Y., ASSIGNORS TO AETNA EXPLOSIVES COMPANY, INC., OF NEW YORK, N. Y., A CORPORATION OF NEW YORK.

PROCESS OF PURIFYING NITRO-AROMATIC COMPOUNDS.

1,297,524.   Specification of Letters Patent.   Patented Mar. 18, 1919.

No Drawing.   Application filed August 9, 1917. Serial No. 185,334.

*To all whom it may concern:*

Be it known that we, HARRY L. WOLLENBERG and CHARLES A. BIGELOW, both citizens of the United States, and residents of the city of New York, county and State of New York, have jointly invented a new and Improved Process of Purifying Nitro-Aromatic Compounds, of which the following is a specification.

This invention relates to the purification of nitro-aromatic compounds, and particularly to the purification of explosive compounds, such as trinitrotoluol, and has for its object to provide a novel, efficient and economical method of obtaining a product having the high standard of purity which is desired for use as an explosive.

Trinitrotoluol which is to be used as an explosive should preferably be sufficiently pure to have a melting point of over 79° C. Such a product can be directly manufactured in the usual ways, but it has been found that it is costly to do so, because very strong acids must be used to obtain this pure product, and such acids dissolve a considerable quantity of the trinitrotoluol in the course of its manufacture. The trinitrotoluol so dissolved is generally lost in the process of recovering the spent acids. Although it is possible to recover some of the trinitrotoluol from the spent acids, the process is very expensive and yields only a partial recovery. For this reason it is common in the art to manufacture a crude trinitrotoluol, which may be made with weaker acids that do not dissolve and thereby waste so much of the material during the process of its manufacture. This crude trinitrotoluol, which usually has a melting point varying from 74° to 77° C., is then purified by treatment with reagents. The reagents heretofore used for this purpose, however, such as alcohol, acetone, carbon tetrachlorid and toluol, are unsatisfactory because they also dissolve a substantial quantity of the trinitrotoluol. The trinitrotoluol so dissolved cannot be recovered in a pure state, as it is mixed with so large a quantity of impurities that it cannot be separated from them. Another objection to the reagents hitherto used for purifying trinitrotoluol is that they are in themselves very expensive. Although it is possible to partially recover such reagents after use, the process of recovering them is expensive.

Our invention provides a solvent for the impurities and the method of using it, which will remove the impurities without dissolving a substantial quantity of the trinitrotoluol. Moreover, this solvent is so cheap that, although it may be recovered after use, it may in practice be thrown away after use without any considerable economic loss.

According to our invention, an aqueous solution of an alkaline sulfite, such as sodium sulfite, —$Na_2SO_3$—, potassium sulfite, —$K_2SO_3$—, or ammonium sulfite, —$(NH_4)_2SO_3$—, is prepared. Sodium sulfite, because of its cheapness and availability is the most satisfactory solvent to use. We recommend the use of a solution from 5% to 10% in strength. Stronger solutions tend to dissolve or decompose the trinitrotoluol. Weaker solutions are not as efficient in dissolving the impurities.

This solution is mixed with the crude trinitrotoluol, preferably in about equal parts, although, of course, the proportions may vary without departing from the scope of this invention. The mixture may be used at ordinary room temperatures, but the temperature preferably should not be permitted to exceed 30° C., as higher temperatures tend to cause solution or decomposition of the trinitrotoluol. The crude trinitrotoluol to which the solution is applied should be in a finely divided or permeable condition, so that the solution may come into intimate contact with the impurities. A number of ways of reducing the crude trinitrotoluol to a sufficiently finely divided or sufficiently permeable state for the purposes of this process are well known. One of the most effective is to mix the molten material with hot water and allow the crystals of trinitrotoluol to form while the mixture is being cooled and agitated. Another method is to "pellet" the crude trinitrotoluol by pouring it in a molten state into cold water. Of course, ordinary granulated crude trinitrotoluol may be used. To assist in bringing the solution into intimate contact with the impurities the mixture is preferably stirred or agitated. Under proper conditions the solution of the impurities takes place quite rapidly, and in a short time the mixture may be filtered.

Substantially all the impurities pass through the filter in the solution and substantially all the trinitrotoluol remains as a residue. It is then washed with water to remove the residue of the solution remaining on the trinitrotoluol.

In carrying out this process it is not necessary to use chemically pure water, although, of course, reasonably pure water should be used. Neither is it necessary to use chemically pure, or even commercially pure, sodium sulfite. For example, we have found that very satisfactory results can be obtained from the use of the sodium sulfite contained in the waste liquors from the manufacture of phenol.

It will be obvious that many variations may be made in the details of procedure above outlined without departing from the spirit and scope of our invention. For example, the crude trinitrotoluol may be mixed with the sodium sulfite solution and the mixture subjected to hydraulic pressure in the manner common in the art. Under such conditions trinitrotoluol may be used in a state in which, without the aid of the pressure, it would not be sufficiently permeable. Again, instead of filtering the mixture to separate the solution from the sodium sulfite, a centrifugal separator may be used. Also, a centrifugal washing machine may be used to circulate the solution through the trinitrotoluol, and to wash the trinitrotoluol after separation of the solution. Although the process has been described above with particular reference to the treatment of trinitrotoluol in which we believe it will find its most important commercial use, the scope of our invention is not limited to the treatment of trinitrotoluol but extends to the treatment of other nitro-aromatic compounds.

What we claim is:

1. The process of treating nitro-aromatic compounds with a solution of an alkaline sulfite.

2. The process of purifying nitro-aromatic compounds by dissolving the impurities in a solution of an alkaline sulfite.

3. The process of purifying trinitrotoluol by dissolving the impurities in a solution of an alkaline sulfite.

4. The process of treating trinitrotoluol with a solution of an alkaline sulfite.

5. The process of purifying nitro-aromatic compounds by dissolving the impurities in a solution of sodium sulfite.

6. The process of purifying trinitrotoluol by dissolving the impurities in a solution of sodium sulfite.

7. The process of purifying crude trinitrotoluol by mixing it in a permeable condition with a sodium sulfite solution, stirring the mixture, filtering to remove the solution, and washing the filtrate.

8. The process of purifying a crude nitro-aromatic compound by mixing it in a permeable condition with a 5% to 10% sodium sulfite solution, separating the solution and washing the product.

9. The process of purifying crude trinitrotoluol by mixing it in a permeable condition with a 5% to 10% sodium sulfite solution, separating the solution and washing the product.

10. The process of purifying a crude nitro-aromatic compound by mixing it in a permeable condition with a 5% to 10% alkaline sulfite solution, separating the solution and washing the product.

11. The process of purifying crude trinitrotoluol by mixing it in a permeable condition with a 5% to 10% alkaline sulfite solution, separating the solution and washing the product.

12. The process of purifying a crude nitro-aromatic compound by mixing it in a permeable condition with about an equal quantity of a 5% to 10% solution of sodium sulfite, maintaining the mixture at a temperature not exceeding 30° C., separating the solution, and washing the product.

13. The process of purifying crude trinitrotoluol by mixing it in a permeable condition with about an equal quantity of a 5% to 10% solution of sodium sulfite, maintaining the mixture at a temperature not exceeding 30° C., separating the solution, and washing the product.

14. The process of purifying a crude nitro-aromatic compound by mixing it in a permeable condition with about an equal quantity of a 5% to 10% solution of alkaline sulfite, maintaining the mixture at a temperature not exceeding 30° C., separating the solution, and washing the product.

15. The process of purifying crude trinitrotoluol by mixing it in a permeable condition with about an equal quantity of a 5% to 10% solution of alkaline sulfite, maintaining the mixture at a temperature not exceeding 30° C., separating the solution, and washing the product.

HARRY L. WOLLENBERG.
CHARLES A. BIGELOW.